United States Patent

Knutsson et al.

[11] Patent Number: 5,810,078
[45] Date of Patent: Sep. 22, 1998

[54] APPARATUS AND METHOD FOR THE ENVIRONMENTAL CONTROL OF VEHICLE INTERIORS

[75] Inventors: Anders M. Knutsson, Trollhättan, Sweden; Wolfgang Kirchner, Filderstadt, Germany

[73] Assignee: Saab Automobile AB, Sweden

[21] Appl. No.: 501,128

[22] PCT Filed: Feb. 11, 1993

[86] PCT No.: PCT/SE93/00103

§ 371 Date: Aug. 10, 1995

§ 102(e) Date: Aug. 10, 1995

[87] PCT Pub. No.: WO94/18021

PCT Pub. Date: Aug. 18, 1994

[51] Int. Cl.⁶ .............. F25B 29/00; B60H 1/00; G05D 23/19
[52] U.S. Cl. .......... 165/203; 165/205; 165/295; 165/42; 165/43; 236/91 C; 236/91 F; 62/229
[58] Field of Search .............. 236/91 C, 91 F, 236/91 R, 91 E; 165/202, 203, 42, 43, 295; 62/229

[56] References Cited

U.S. PATENT DOCUMENTS

| | | | |
|---|---|---|---|
| 4,344,565 | 8/1982 | Kojima et al. | 236/91 C |
| 4,345,714 | 8/1982 | Kojima | 236/91 C |
| 4,757,944 | 7/1988 | Kagohata et al. | |
| 5,209,398 | 5/1993 | Drees | 236/91 F |
| 5,337,802 | 8/1994 | Kajino et al. | 236/91 C |
| 5,436,852 | 7/1995 | Kan | 236/91 C |

FOREIGN PATENT DOCUMENTS

| | | | |
|---|---|---|---|
| 0381846 | 8/1990 | European Pat. Off. | |
| 0492324 | 7/1992 | European Pat. Off. | |
| 0139816 | 8/1983 | Japan | 236/91 C |

*Primary Examiner*—John K. Ford
*Attorney, Agent, or Firm*—Ostrolenk, Faber, Gerb & Soffen, LLP

[57] ABSTRACT

An apparatus and method for controlling the air condition and heating within a vehicle interior compartment, in which the apparatus includes a fan (13), heat exchangers (14, 15), temperature sensors (26, 27, 28) and a solar sensor (29) and temperature control (47) for setting a desired temperature. The apparatus further includes a control unit (46) which is operative to calculate a theoretical interior temperature $T_I$ based only upon information from sensors (26, 29) sensing the external heat load of the compartment, a sensor (27) sensing the temperature of the air supplied to the compartment and fan current representative of the volume of air supplied to the compartment. The control unit (46) compares this theoretical interior temperature $T_I$ with the preset temperature $T_{ISet}$, calculates the difference $\Delta T_I$, and then controls air flow and mixed temperature $T_M$ to readjust or maintain the interior temperature within the compartment (19) at the preset temperature $T_{ISet}$.

11 Claims, 2 Drawing Sheets

APPARATUS AND METHOD FOR THE ENVIRONMENTAL CONTROL OF VEHICLE INTERIORS

BACKGROUND OF THE INVENTION

This invention relates to an apparatus and method for the environmental control of the interior space of a motor vehicle and in particular to the maintenance of air temperatures at predetermined temperature levels.

Most vehicles are now equipped with air conditioning and heating systems for maintaining the air within the vehicle passenger compartment at a set desired temperature value.

In order to maintain the temperature at the desired value it is typically necessary to detect the ambient (external) air temperature, the internal air temperature, mixed air temperature (that is the temperature of air immediately prior to discharge into the vehicle interior) and to control the air flow and distribution within the compartment based on the detected parameters. More advanced systems also use a sun sensor to detect the thermal load of the compartment.

The interior space temperature at various locations depends on the thermal load of the interior space. It is therefore difficult to obtain a representative value of the temperature within a passenger compartment. The thermal load of the interior space depends on the heat quantity introduced thereinto or discharged therefrom due to differences in temperature between outside air temperature and inside air temperature, the heat quantity absorbed thereinto as solar heat, the heat radiated from the passengers bodies, the heat quantity absorbed thereinto from the engine and electrical equipment and the heat quantity introduced or discharged therefrom due to the air-conditioning and heating system. Furthermore, depending on the different temperatures, air-flow speed and the direction of the airflow introduced into the interior space, to maintain the appropriate preset value it is necessary to determine the actual interior space temperature.

In order to ideally monitor the heat distribution within the passenger compartment it is necessary to use more than one temperature sensor for control of the heating system in order to maintain the appropriate preset temperature. Such a temperature sensor is often connected to an air-pump, in order to obtain a sufficient circulation of air around the sensor. Even though an air-pump is used for circulating the air around the temperature sensor, unreliable readings may be obtained due to local heat sources e.t.c around the temperature sensor. The control of the temperature in the passenger compartment could therefore be severly affected, especially if the control strategy basically is dependent on the readings from the interior temperature sensor. Temperature sensors are also relatively expensive and produce noise inside the vehicle. All of these things must be taken into consideration when designing a climate control system, therefore it is desirable to eliminate the interior space temperature sensor.

SUMMARY OF THE INVENTION

The present invention provides an environmental control system for the interior of a motor vehicle in which the above problems have been eliminated since the control system does not use any temperature sensor within the vehicle interior.

The system includes a control unit which is operative to calculate a theoretical interior temperature $T_I$ based only upon information from sensors sensing the external heat load on the compartment and the temperature of the air and volume of air supplied to the compartment, and compares this theoretical interior temperature $T_I$ with the preset temperature $T_{ISet}$, calculates the difference $\Delta T_I$, and then controls air flow and mixed temperature $T_M$ to readjust or maintain the interior temperature within the compartment at the preset temperature $T_{ISet}$.

The inventive concept enables usage of temperature values only from temperature sensors so arranged that they are naturally exposed by the conditioning and heating system to a sufficient air-flow, thus enabling an accurate temperature reading, and solar radiation sensor for the external heat load sensed.

Accordingly there is provided an apparatus for environmental control of the interior of a motor vehicle, the apparatus comprising an ambient air temperature sensor for monitoring ambient air temperature, a radiation sensor for measuring the intensity of radiation entering the interior of the vehicle, a mixed air temperature sensor for sensing the temperature of air in the air flow from the fan to the passenger compartment, at least one heat exchange to control the temperature of the air flow from the fan, a control for setting the desired interior temperature and a control unit connected to said sensors, fan, heat exchangers, and temperature control and which is operative to calculate a theoretical interior temperature based on the ambient air temperature, the mixed air temperature, radiation intensity, and the air flow from the fan and to compare the calculated theoretical temperature value with the preset temperature value, calculates the difference and controls the airflow and mixed temperature accordingly to achieve and maintain the preset interior temperature.

There is also provided a method of environmental control of the interior of a motor vehicle the vehicle having an environmental control apparatus including a fan, a heat exchanger which can vary the temperature of the airflow from the fan, said method comprising:

presetting a desired interior temperature, detecting the exterior ambient temperature of air external of the vehicle, detecting a mixed air temperature of air in the air flow from the fan to the interior of the vehicle, and detecting the volume of air flow from the fan to the interior of the vehicle, characterized in that the method further includes detecting any radiant energy entering the vehicle, and producing a theoretical interior temperature value calculated from ambient air temperature, mixed air temperature, radiant energy intensity, and airflow comparing the theroretical temperature value with the preset temperature value to produce a temperature difference, which is utilized to control air flow and mixed air temperature, in order to achieve and maintain preset interior temperature.

The invention thus only uses information from sensors sensing the external heat load on the compartment and the temperature and volume of air supplied to the compartment in order to control the heating of the air supplied to the compartment.

BRIEF DESCRIPTION OF THE DRAWING

The invention will be described by way of example and with reference to the accompanying drawings in which.

DETAILED DESCRIPTION OF THE PREFERRED EMBODIMENT(S)

Figure 1:
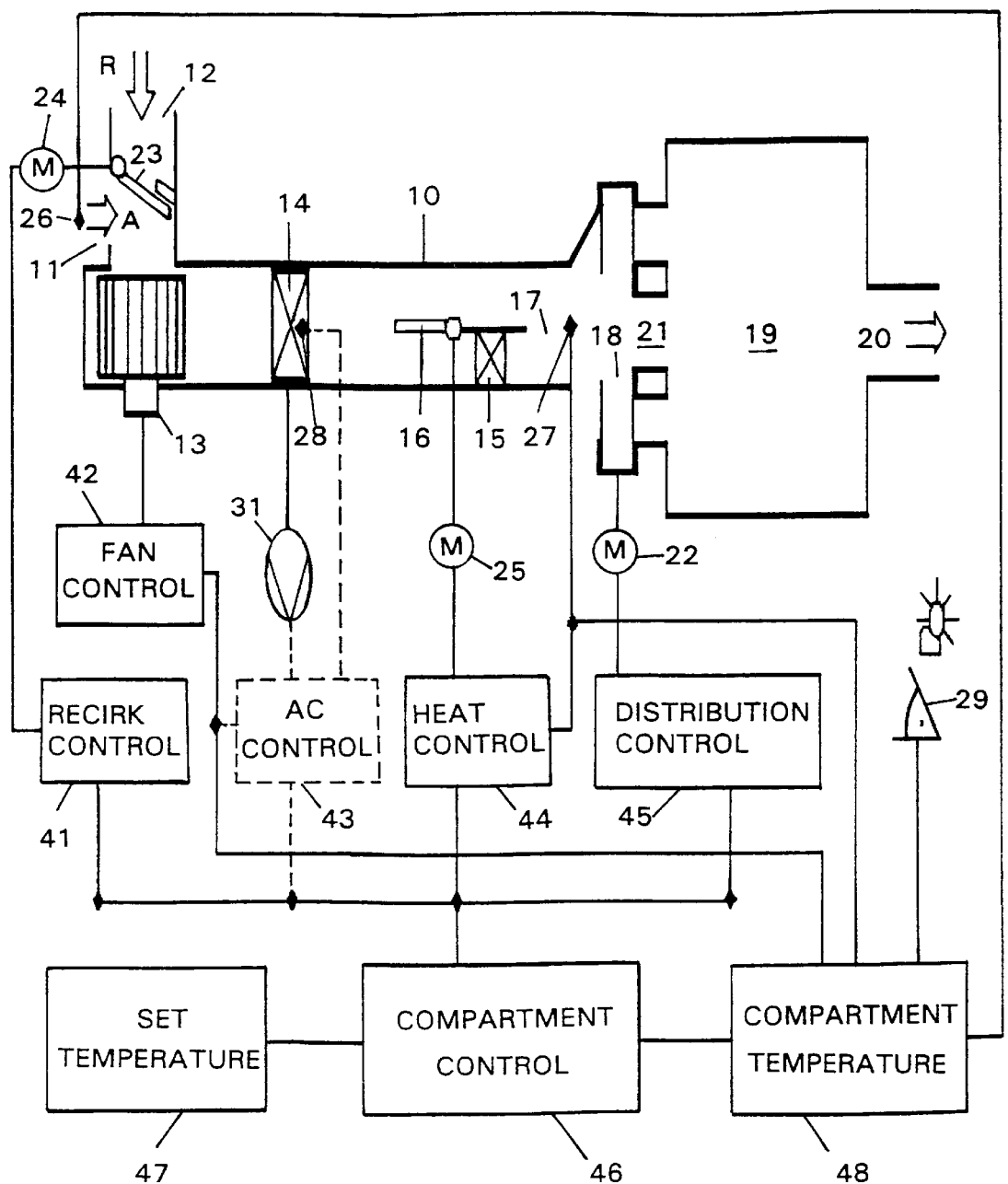
FIG. 1 shows a schematic layout of an environmental control system according to the present invention for a vehicle interior compartment.

With reference to the drawings, there is illustrated in schematic form an environmental control system for the interior of a motor vehicle and, more specifically, an air conditioning and heating system for the passenger compartment of a vehicle.

Ducting 10 has an ambient air inlet 11 to receive ambient air A from outside of the vehicle. The ducting 10 also has a second inlet 12 to receive recirculated air R from within the vehicle. The air can be drawn into ducting 10 by a blower fan 13 which is driven by an electric motor.

The inducted air is then cooled by an evaporator 14 having a compressor 31, and then the cooled air passes over a heat exchanger 15 which heats a portion of the air flow. The amount of cooled air which is passed over the heat exchanger is controlled by a gate valve 16 operated by a motor 25. The heated air is remixed with the cooled air in a mixing chamber 17 downstream of the gate valve 16 and is discharged into a passenger compartment 19 via air distribution system 18 and outlet ducts 21. The distribution system 18 is controlled by a motor 22 to determine the air distribution within the compartment 19. Air exits the interior of the vehicle through exit ducts 20.

The ratio of recirculated air to fresh air entering the ducting 10 is controlled by a second gate valve 23 operated by a motor 24.

The operating conditions within the ducting are monitored by a plurality of sensors. An ambient air temperature sensor 26 is located in the ambient air inlet 11, a mixed air temperature sensor 27 is located in the mixing chamber 17, and a cooled air temperature sensor 28 is located adjacent the evaporator 14. A solar sensor 29 within the passenger compartment measures the sun's intensity and elevation.

The system is controlled by an electronic circuit including micro processors. The control will be explained by means of a block diagram. The ambient/recirculated air for the value 23 is controlled by a recirculation control 41. The fan 13 is controlled by a fan control 42. The evaporator 14 and compressor 31 are controlled by an air conditioning control 43. The gate valve 16 is controlled by a heat control 44. The distribution system is controlled by the distribution control 45. All said controls 41–45 are connected to compartment control 46 includes micro processor means.

The compartment control 46 is connected to a temperature control 47 for presetting a desired interior temperature $T_{ISet}$, and is further connected to compartment temperature calculator 48. The temperature calculator 48 includes microprocessor means and is connected to the sensors 26, 27, and 29, and to the fan control 42 and air conditioning control 43.

The recirculation control 41 operates the motor 24 to move the gate valve 23 depending upon the ambient air temperature, the distribution system setting for distributing air within the compartment 19,and the previous conditions within the system. The control 41 can be manually overridden. The fan control 42 controls the fan motor by controlling the current to the motor and can be manually overridden.

The air conditioning control 43 is connected to the cooled air sensor 28 and controls the evaporator 14 dependent upon signals received from the compartment control 46. Again the air conditioning control can be manually overridden.

The heat control 44 measures the mixed air temperature via the sensor 27, detects the position of the gate valve 16, and controls the mixed air temperature by controlling the position of the gate valve 16. The gate valve position can vary between fully open and fully closed depending upon the desired temperature of the mixed air.

The distribution control detects and controls the operative condition of the distribution system so the desired outlet ducts 21 are utilized.

The compartment temperature calculator 48 measures the ambient air temperature $T_A$ through sensor 26, the mixed air temperature $T_M$ through sensor 27, the solar intensity $S_I$ and solar elevation $S_E$ through the solar sensor 29, the blower fan current $I_F$ and calculates a theoretical interior compartment temperature $T_I$ allowing to the following calculation;

$$dT_I/dt = a \cdot I_F \cdot T_M + b \cdot f(T_M, T_A, \ldots) + c \cdot T_A + E \cdot \cos(S_E) \cdot S_I - e \cdot T_I$$

where:

$$e = a \cdot I_F + b + c$$

Figure 2:
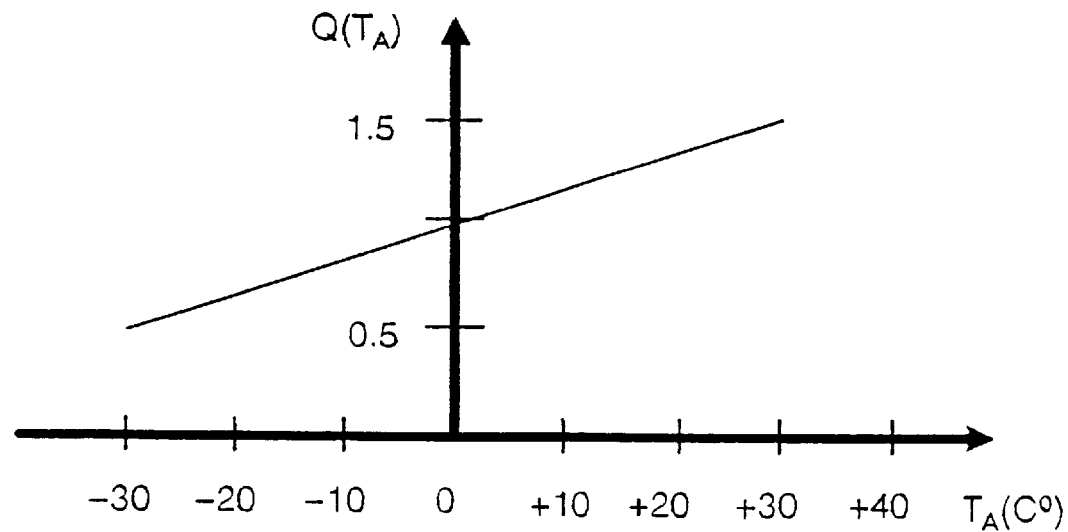
FIG. 2 shows a function for calculating a start/previous value for $T_I$.

Temperatures are in C°, Celsius degrees.

a–c are constants, $I_F$ is blower fan current in ampere (A), $T_A$ and $T_M$ are as above, $T_I$ is the calculated interior space temperature, $S_E$ is angle of elevation of the sun (the Zenith =90°), $S_I$ is the solar intensity measured in W/m$^2$, E has in general a cosine characteristic, but depends on window angle and size, $f(T_M, T_A, \ldots)$ is a function for calculating a start/previous value for $T_I$ and can for example look like this: $f(T_M, T_A, \ldots) = Q(T_A) \cdot T_M$. (see also FIG. 2)

The compartment control 46 compares the calculated, temperature $T_I$ value with the preset desired temperature $T_{ISet}$ and calculates a temperature difference $\Delta T_I$. The temperature difference $\Delta T_I$ is then used in combination with the measured ambient temperature $T_A$, mixed air temperature $T_M$, blower fan current $I_F$ and solar intensity $S_I$ and solar elevation $S_E$, to calculate new values for the blower current, mixed air temperature, distribution system condition, ambient/recirculated gate valve position. These new values are sent to the respective control units so that they can be executed.

Figure 3:
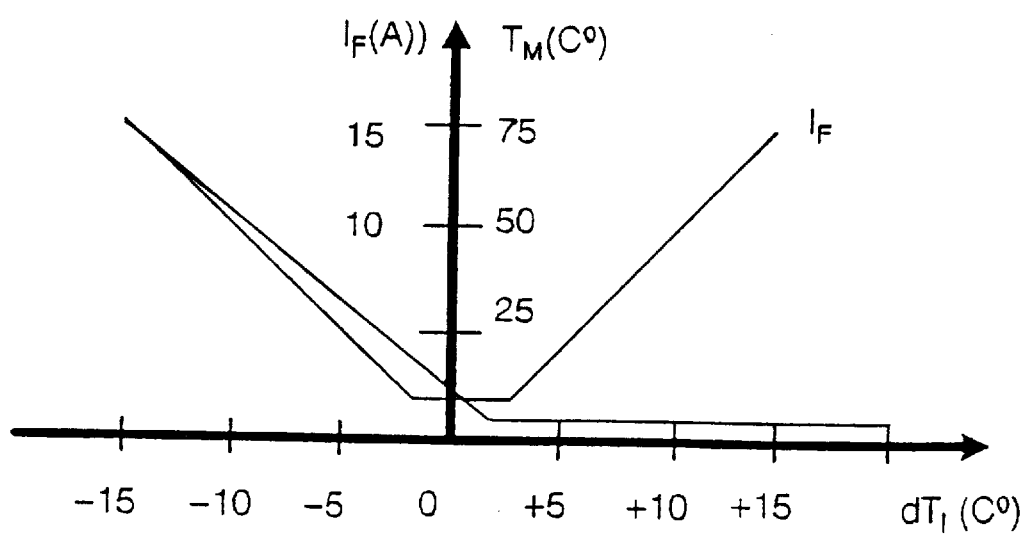
FIG. 3 shows a function for controlling blower fan current IF and mixed air temperature dependent on $dT_I$.

The control of the blower fan current $I_F$ and the mixed air temperature $T_M$, are controlled by the fan control unit (42) and the heat control unit (44) where $dT_I$ is one of its parameters and can preferably follow the relations depicted in FIG. 3.

Where it is desired to operate the control system to control the environment in a two zoned interior space for example, a left zone and a right zone or front and rear zones, then said equations are:

For the right (or front) zone, $$dT_{Ir}/dt = a \cdot I_{Fr} \cdot T_{Mr} + b \cdot f_1(T_{Mr}, T_A, \ldots) + c \cdot T_A + E \cdot \cos(S_E) \cdot S_I \cdot f_2(S_{Ar}) + g \cdot (T_{Il} - T_{Ir}) - e_r \cdot T_{Ir}$$

and for the left (or rear) zone, $$dT_{Il}/dt = a \cdot I_{Fl} \cdot T_{Ml} + b \cdot f(T_{Ml}, T_A, \ldots) + c \cdot T_A + E \cdot \cos(S_E) \cdot S_I \cdot f_2(S_{Al}) + g \cdot (T_{Ir} - T_{Il}) - e_r \cdot T_{Il}$$

where $$e_r = a \cdot I_{Fr} + b + c$$

$$e_l = a \cdot I_{Fl} + b + c$$

a-c and g are constants $I_{Fr}$ is the blowerfan current (airflow) right side in ampere (A), $I_{Fl}$ is the blowerfan current (airflow) left side in ampere (A), $T_A$ is the ambient air temperature in degrees C°, $T_{Mr}$ is the mixed air temperature right side in degrees celsius (C°), $T_{Ml}$ is the mixed air temperature left side in degrees celsius (C°), $T_{Ir}$ is the right side calculated interior temperature in degrees C°, $T_{Il}$ is the left side calculated interior temperature in degrees C°, $S_E$ is the angle of elevation of the sun in degrees (zenith =90°), $S_I$ is the solar intensity measured in W/m², E has in general a cosine characteristic, but depends on window angle and size, $f_1(T_{Mr},T_A,...)$ is a function for calculating a start-/previous value for $T_{Ir}$, $f_2(T_{Ml},T_A,...)$ is a function for calculating a start-/previous value for $T_{Il}$, $f_2(S_{Ar})$ is a function for calculating the solarload of the right side, $f_2(S_{Al})$ is a function for calculating the solarload of the left side.

The inventive apparatus and method is not limited to environmental control of interiors of motor vehicles with environmental control apparatuses entirely lacking the usage of an interior temperature sensor. The control method could preferably also be used together with an interior temperature sensor, and then be used to improve the system performance by achieving an average value between calculated interior space temperature and the interior temperature measured by the interior temperature sensor. Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A method of environmental control of the interior of a motor vehicle the vehicle having an environmental control apparatus including a fan for supplying an air flow to the interior of the vehicle and a heat exchanger which can vary the temperature of the airflow from the fan, said method comprising:

presetting a desired interior temperature, detecting the exterior ambient temperature of air external of the vehicle, detecting a mixed air temperature of air in the air flow from the fan to the interior of the vehicle, and detecting the volume of air flow from the fan to the interior of the vehicle, detecting radiation energy entering the vehicle, and producing a theoretical interior temperature value calculated from ambient air temperature, mixed air temperature, radiation intensity and airflow, and comparing the theoretical temperature value with the preset temperature value to produce a temperature difference, which is utilized to control air flow and mixed air temperature in order to achieve and maintain the desired preset interior temperature.

2. A control method as claimed in claim 1, wherein the radiation energy is solar energy.

3. A control method as claimed in claim 2, wherein the solar energy is measured as a function of solar intensity and solar elevation.

4. A control method as claimed in claim 3, wherein the calculated temperature is given by the following equation;

$$dT_I/dt = a \cdot I_F \cdot T_M + b \cdot f(T_M, T_A, ...) + c \cdot T_A + E \cdot cos(S_E) \cdot S_I - e \cdot T_I$$

where:

$$e = a \cdot I_F + b + c$$

Temperatures are in C°, Celsius degrees.

a–c are constants, $I_F$ is blower fan current in ampere (A), $T_A$ is ambient air temperature and $T_M$ is mixed air temperature, $T_I$ is the calculated interior space temperature, $S_E$ is angle of elevation of the sun (the Zenith =90°), $S_I$ is the solar intensity measured in W/m², E has in general a cosinus characteristic, but depending on window angle and size, $f(T_M,T_A,...)$ is a function for calculating a start/previous value for $T_I$.

5. A control method as claimed in claim 3 for a two zoned interior space, wherein calculated temperatures for two zones are given by equations: for one zone, $$dT_{Ir}/dt = a \cdot I_{Fr} \cdot T_{Mr} + b \cdot f_1(T_{Mr}, T_A, ...) + c \cdot T_A + E \cdot cos(S_E) \cdot S_I f_2(S_{Ar}) + g \cdot (T_{Il} - T_{Ir}) - e_r \cdot T_{Ir}$$

and for the second zone, $$dT_{Il}/dt = a \cdot I_{Fl} \cdot T_{Ml} + b \cdot f(T_{Ml}, T_A, ...) + c \cdot T_A + E \cdot cos(S_E) \cdot S_I f_2(S_{Al}) + g \cdot (T_{Ir} - T_{Il}) - e_l \cdot T_{Il}$$

where $$e_r = a \cdot I_{Fr} + b + c$$

$$e_l = a \cdot I_{Fl} + b + c$$

a–c and g are constants $I_{Fr}$ is the blowerfan current (airflow), first zone, in ampere (A), $I_{Fl}$ is the blowerfan current (airflow), second zone, in ampere (A), $T_A$ is the ambient air temperature in degrees C°, $T_{Mr}$ is the mixed air temperature, first zone, in degrees celsius (C°), $T_{Ml}$ is the mixed air temperature, second zone, in degrees celsius (C°), $T_{Ir}$ is the, first zone, calculated interior temperature in degrees C°, $T_{Il}$ is the, second zone, calculated interior temperature in degrees C°, $S_E$ is the angle of elevation of the sun in degrees (Zenith =90°), $S_I$ is the solar intensity measured in W/m², E has in general a cosinus characteristic, but depending on window angle and size, $f_1(T_{Mr},T_A,...)$ is a function for calculate a start-/previous value for $T_{Ir}$, $f_2(T_{Ml},T_A,...)$ is a function for calculate a start-/previous value for $T_{Il}$, $f_2(S_{Ar})$ is a function for calculate the solarload of the first zone, $f_2(S_{AJ})$ is a function for calculate the solarload of the second zone.

6. Apparatus for environmental control of the interior of a motor vehicle, the apparatus comprising:

a fan supplying an air flow to the vehicle interior;

an ambient air temperature sensor for monitoring ambient air temperature;

a radiation detector for measuring the intensity of radiation entering the interior of the vehicle;

at least one heat exchanger to control the temperature of the air flow from the fan;

mixed air temperature sensor for sensing the temperature of air in the air flow from the fan to the vehicle interior;

preset means for presetting a desired interior temperature value;

air flow control means for controlling the air flow from the fan to the vehicle interior; and a control unit connected to the ambient air temperature and mixed air temperature sensors, the radiation detector and the heat exchanger for (i) calculating a theoretical interior temperature based on the ambient air temperature, the mixed air temperature, the radiation intensity, and the air flow from the fan, (ii) comparing the calculated theoretical temperature value with the preset desired temperature value,,and (iii) controlling the fan, the air flow control means and the heat exchanger in accordance with the difference between the calculated theoretical temperature/value and the preset desired temperature value to control air flow and mixed temperature to achieve and maintain the preset desired interior temperature value.

7. Apparatus as claimed in claim 6, wherein the heat exchanger comprises evaporator means for cooling the air being supplied by the fan and a heater located downstream of the evaporator for heating air directed thereto.

8. Apparatus as claimed in claim 7, wherein the air flow control means includes distributor means for controlling the percentage of cooled air which is directed to the heater in order to achieve a desired mixed air temperature.

9. Apparatus as claimed in claim 8, wherein the evaporator means includes an evaporator located downstream of the fan, an evaporator temperature sensor for sensing the temperature at the evaporator, a compressor connected to the evaporator and an air conditioning control unit responsive to the temperature sensor and to the control unit for controlling the compressor to produce cooled air.

10. Apparatus as claimed in claim 6, wherein the radiation detector is a solar sensor.

11. Apparatus as claimed in claim 10, wherein the solar sensor (29) measures the solar intensity ($S_I$), the solar elevation ($S_E$) and the solar azimuth ($S_A$).

* * * * *